(12) United States Patent
Huang

(10) Patent No.: US 12,534,146 B2
(45) Date of Patent: Jan. 27, 2026

(54) VERTICAL PARKING HOLDER USED FOR BICYCLE

(71) Applicant: Suzhou Firefly Information Technology Co., Ltd., Suzhou (CN)

(72) Inventor: Muzhi Huang, Suzhou (CN)

(73) Assignee: Suzhou Firefly Information Technology Co., Ltd., Suzhou (CN)

( * ) Notice: Subject to any disclaimer, the term of this patent is extended or adjusted under 35 U.S.C. 154(b) by 0 days.

(21) Appl. No.: 18/900,785

(22) Filed: Sep. 29, 2024

(65) Prior Publication Data

US 2025/0042488 A1   Feb. 6, 2025

(30) Foreign Application Priority Data

Aug. 3, 2023  (CN) .......................... 202322079805.7

(51) Int. Cl.
  *B62H 3/02*  (2006.01)
  *B62H 3/08*  (2006.01)

(52) U.S. Cl.
  CPC ................. *B62H 3/02* (2013.01); *B62H 3/08* (2013.01)

(58) Field of Classification Search
  CPC ... B62H 3/02; B62H 3/08; B62H 3/12; B62H 3/06; B62H 1/04; B62B 5/0083; B62B 2202/90; B60P 3/07; B60P 3/075; B60P 3/077; B25H 1/0014
  See application file for complete search history.

(56) References Cited

U.S. PATENT DOCUMENTS

| | | | | |
|---|---|---|---|---|
| 4,388,502 A * | 6/1983 | Cohn | ...................... | B64C 21/10 367/906 |
| 5,709,521 A * | 1/1998 | Glass | ...................... | B60R 9/042 224/310 |
| 6,053,336 A * | 4/2000 | Reeves | .................... | B62H 3/08 211/20 |
| 6,241,616 B1 * | 6/2001 | Lightcap | ................... | F16C 3/03 464/158 |
| 6,287,069 B1 * | 9/2001 | Oliphant | ................. | B60P 3/122 414/430 |
| 8,496,148 B2 * | 7/2013 | Farney | ...................... | B60R 9/06 224/533 |
| 8,807,506 B2 * | 8/2014 | Hanlon | .................. | F16M 11/18 248/354.4 |
| 10,308,159 B2 * | 6/2019 | Bovero | ................. | B62B 5/0093 |
| 11,008,060 B1 * | 5/2021 | Liu | ........................... | B62H 3/10 |
| 11,505,267 B1 * | 11/2022 | Gu | ........................... | B62H 3/04 |
| 11,839,966 B1 * | 12/2023 | Helmrich | ............. | B25H 1/0014 |

(Continued)

*Primary Examiner* — Ko H Chan

(74) *Attorney, Agent, or Firm* — Westbridge IP LLC

(57) ABSTRACT

Disclose is a vertical parking holder used for a bicycle including a rear wheel and a seat holder. The vertical parking holder includes a front beam, a rear beam, a pair of connecting rods parallel to each other, a telescopic rod and a pair of position limitation holders. Each of the front beam and the rear beam is provided with a pair of caster wheels at the bottom. One end of the telescopic rod is fixedly connected to the front beam and the other end of the telescopic rod is provided with a supporting holder. The telescopic rod is provided with a binding band. Two ends of the pair of connecting rods are fixedly connected to the front beam and the rear beam respectively to form a gap. The vertical parking holder as provided by the present disclosure has a wide range of applications, excellent stability and high safety.

14 Claims, 5 Drawing Sheets

(56) References Cited

U.S. PATENT DOCUMENTS

| | | | | |
|---|---|---|---|---|
| 12,091,116 B1* | 9/2024 | Gu | ............................ | B62H 3/08 |
| 12,202,561 B2* | 1/2025 | Hammerslough | ....... | B62H 3/02 |
| 2005/0082329 A1* | 4/2005 | Cohen | ........................ | B60R 9/10 |
| | | | | 224/924 |
| 2007/0164065 A1* | 7/2007 | Davis | ........................ | B60R 9/10 |
| | | | | 224/324 |
| 2016/0068111 A1* | 3/2016 | Walker | ...................... | B60R 9/10 |
| | | | | 224/521 |
| 2024/0336315 A1* | 10/2024 | Hammerslough | ....... | B62H 3/02 |

* cited by examiner

VERTICAL PARKING HOLDER USED FOR BICYCLE

CROSS-REFERENCE TO RELATED APPLICATIONS

The present application claims priority to Chinese Patent Application No. 202322079805.7, filed on Aug. 3, 2023, which is incorporated herein by reference in its entirety.

TECHNICAL FIELD

The present disclosure relates to the field of bicycle parking holder technologies, and in particular, to a vertical parking holder used for a bicycle.

BACKGROUND

Currently, there are a lot of public bicycles which are generally located on urban streets. As there is no standard and regular parking device, the bicycles are usually parked randomly after usage, resulting in inconvenience for passengers and urban environmental protection and maintenance. A vertical parking holder becomes popular as it may save occupied area of the bicycles.

The vertical parking holder in related art mainly includes a metal base and an auxiliary vertical rod. The metal base is provided with a groove. When a bicycle is to be parked, a rear wheel of the bicycle is placed in the groove first. Then, the bicycle is rotated by 90 degrees and a seat of the bicycle is clamped in the auxiliary vertical rod to complete parking. The vertical parking holder may be used only for bicycles having a tire of a special size and is poor in applicability. It is also poor in stability as the bicycle is supported by only one auxiliary vertical rod, and the bicycle is prone to falling down to cause a safety accident.

SUMMARY

With respect to defects of the vertical parking holder in the related art, the present disclosure provides a vertical parking holder used for a bicycle, with a wide range of applications, excellent stability and high safety.

The present disclosure is achieved by the following technical solutions.

A vertical parking holder, used for a bicycle including a rear wheel and a seat holder, includes a front beam, a rear beam, a pair of connecting rods parallel to each other, a telescopic rod and a pair of position limitation holders; where one end of the telescopic rod is fixedly connected to the front beam and the other end of to the telescopic rod is provided with a supporting holder for supporting the seat holder, and the telescopic rod is provided with a binding band for binding and fixing the seat holder; one end of the connecting rod is fixedly connected to the front beam and the other end of the connecting rod is fixedly connected to the rear beam, with a gap formed between the pair of connecting rods for receiving the rear wheel; and two ends of the position limitation holder are fixedly connected to the pair of connecting rods respectively, with a distance between the pair of position limitation holders being adjustable for limiting the rear wheels of different sizes.

Furthermore, the two ends of the position limitation holder are fixedly connected to the pair of connecting rods by adjusting screws respectively, and when the adjusting screw is unscrewed, each of the pair of position limitation holders is slidable on the connecting rod.

Furthermore, the adjusting screw passes through the position limitation holder to prop against the connecting rod.

Furthermore, the position limitation holder is provided with a first sliding hole and a second sliding hole, and the pair of connecting rods pass through the first sliding hole and the second sliding hole respectively.

Furthermore, the position limitation holder is further provided with a rib between the first sliding hole and the second sliding hole.

Furthermore, the position limitation holder is further provided with a groove portion on both sides of the position limitation holder to reduce a weight of the position limitation holder.

Furthermore, an upper end of the position limitation holder is provided with a V-shape groove for position limitation of the rear wheel.

Furthermore, the pair of connecting rods are fixedly connected to the front beam and the rear beam respectively by welding.

Furthermore, the telescopic rod includes a first standing rod, a second standing rod and a locking part. One end of the first standing rod is fixedly connected to the front beam and the other end of the first standing rod is sleeve-connected to one end of the second standing rod, and the other end of the second standing rod is fixedly connected to the supporting holder. One end of the locking part is sleeve-connected to an outer side of the first standing rod and the other end of the locking part is sleeve-connected to an outer side of the second standing rod. The locking part is configured to lock the first standing rod and the second standing rod.

Furthermore, the supporting holder and the second standing rod are integrally formed. The supporting holder includes a first supporting rod and a second supporting rod, with a position limitation groove formed between the first supporting rod and second supporting rod for supporting the seat holder.

Furthermore, the second standing rod is provided with a bending rod, and one end of the binding band is sleeve-connected to the bending rod.

Furthermore, the locking part includes a first sleeve connection portion and a second sleeve connection portion. The first sleeve connection portion is fixed and locked, by a first screw, on the outer side of the first standing rod, and the second sleeve connection portion is fixed and locked, by a second screw, on the outer side of the second standing rod.

Furthermore, each of the front beam and the rear beam is provided with a pair of caster wheels at the bottom.

Furthermore, the caster wheel is a universal wheel.

Furthermore, a rear side of the caster wheel is provided with a braking vane.

DETAILED DESCRIPTION OF THE EMBODIMENTS

Hereinafter, the technical solutions of the present disclosure will be further described in details in a non-limitative manner in combination with preferred embodiments and their accompanying drawings. In the description of the present disclosure, it should be understood that the position or direction relation as indicated by the expressions of "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential" and the like are based on the accompanying drawings. In addition, the expressions of "first" and "second" are used only for purpose of description, and cannot be understood as indicating or suggesting relative importance or implicitly specifying a quantity of indicated technical features. In the description of the present disclosure, "a plurality of" means at least two, such as two, three, and so on, unless it is otherwise specified clearly. The embodiments to be described below referring to the accompanying drawings are exemplary, for explaining the present disclosure, and cannot be understood as limitation on the present disclosure.

Figure 1:
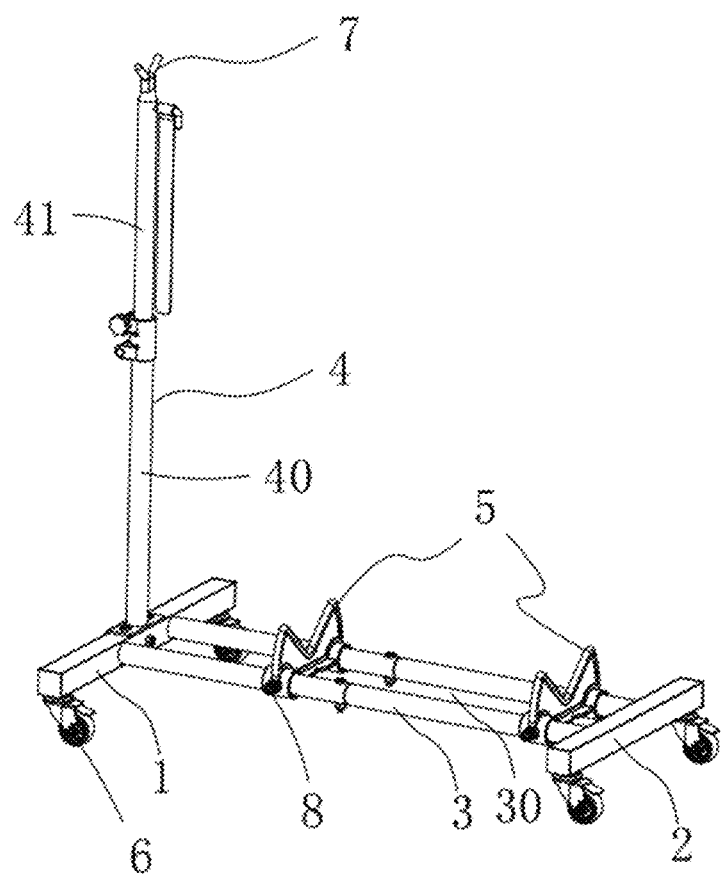
FIG. 1 is a structural diagram of a vertical parking holder provided by an embodiment of the present disclosure.
Figure 2:
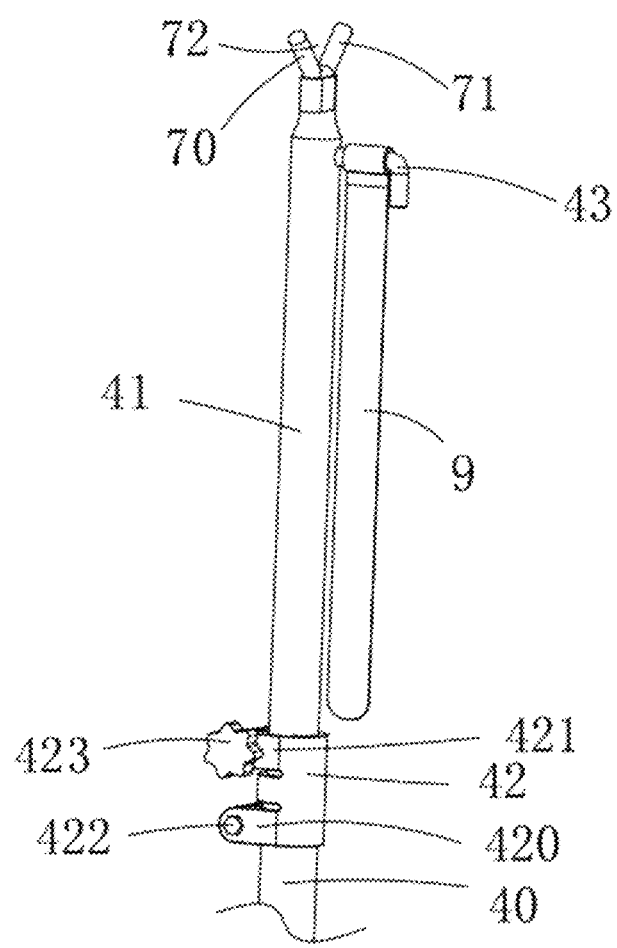
FIG. 2 is a partial structural diagram of a vertical parking holder.
Figure 3:
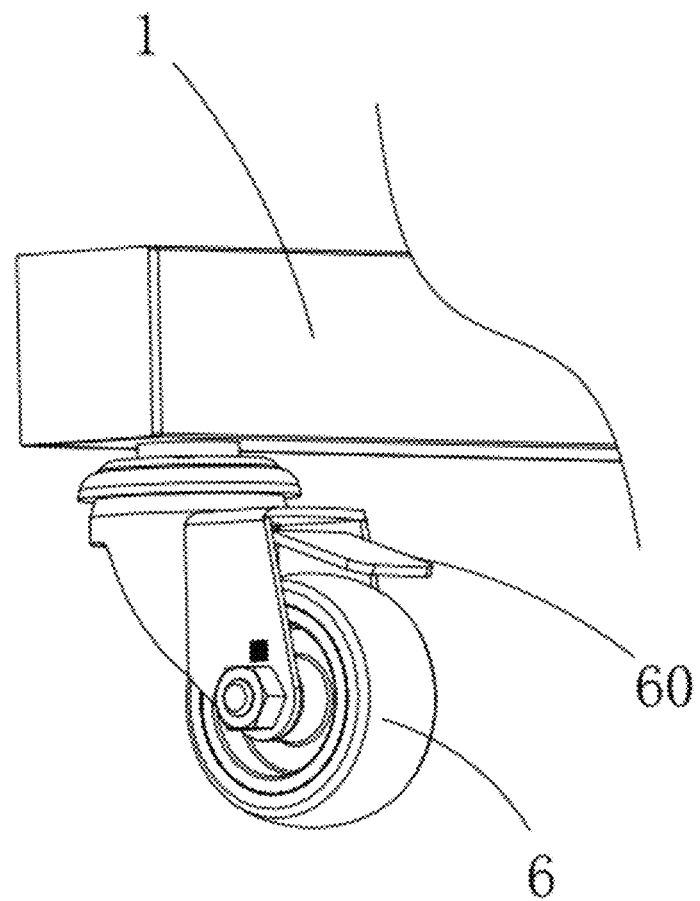
FIG. 3 is a partial structural diagram of a vertical parking holder.
Figure 4:
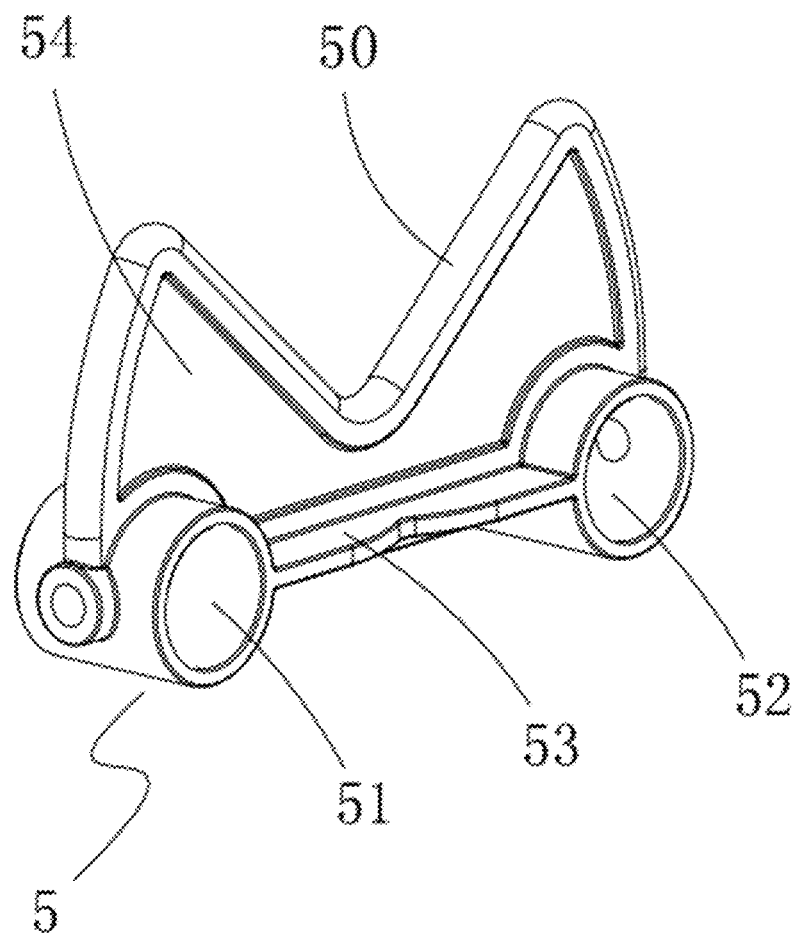
FIG. 4 is a structural diagram of a position limitation holder.
Figure 5:
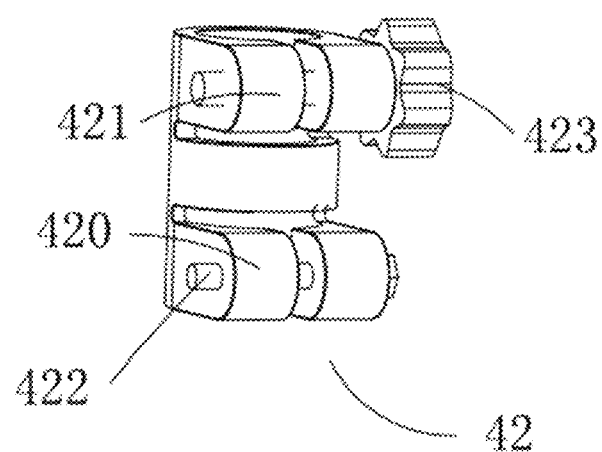
FIG. 5 is a structural diagram of a locking part.

As shown in FIGS. 1 to 5, an embodiment of the present disclosure provides a vertical parking holder used for a bicycle including a rear wheel and a seat holder. The vertical parking holder includes a front beam 1, a rear beam 2, a pair of connecting rods 3 parallel to each other, a telescopic rod 4 and a pair of position limitation holders 5. Each of the front beam 1 and the rear beam 2 is provided with a pair of caster wheels 6 at the bottom. One end of the telescopic rod 4 is fixedly connected to the front beam 1 and the other end of the telescopic rod 4 is provided with a supporting holder 7 for supporting the seat holder. The telescopic rod 4 is provided with a binding band 9 for binding and fixing the seat holder. One end of the connecting rod 3 is fixedly connected to the front beam 1 and the other end of the connecting rod 3 is fixedly connected to the rear beam 2, with a gap 30 formed between the pair of connecting rods 3 for receiving the rear wheel. Two ends of the position limitation holder 5 are fixedly connected with the pair of connecting rods 3 respectively, with a distance between the pair of position limitation holders 5 being adjustable for limiting the rear wheel of different sizes.

In the present embodiment, the pair of connecting rods 3 are fixedly connected to the front beam 1, the rear beam 2 respectively by welding.

The two ends of the position limitation holder 5 are fixedly connected to the pair of connecting rods 3 by adjusting screws 8 respectively. When the adjusting screw 8 is unscrewed, each of the pair of position limitation holders 5 is capable of sliding on the connecting rod 3. Specifically, the adjusting screw 8 passes through the position limitation holder 5 to prop against the connecting rod 3.

The position limitation holder 5 is provided thereon with a first sliding hole 51 and a second sliding hole 52. The pair of connecting rods 3 pass through the first sliding hole 51 and the second sliding hole 52 respectively. The position limitation holder 5 is capable of sliding on the connecting rod 3 by the first sliding hole 51 and the second sliding hole 52, so that the distance between the two position limitation holders 5 may be adjusted.

An upper end of the position limitation holder 5 is provided with a V-shape groove 50 for position limitation of the rear wheel.

The position limitation holder 5 is further provided with a rib 53 between the first sliding hole 51 and the second sliding hole 52, so that structural stability of the position limitation holder 5 may be improved.

The position limitation holder 5 is further provided with a groove portion 54 on both sides of the position limitation holder 5, so that a weight of the position limitation holder 5 and the material cost may be reduced.

The telescopic rod 4 includes a first standing rod 40, a second standing rod 41 and a locking part 42. One end of the first standing rod 40 is fixedly connected to the front beam 1 and the other end of the first standing rod 40 is sleeve-connected to one end of the second standing rod 41, and the other end of the second standing rod 41 is fixedly connected to the supporting holder 7. One end of the locking part 42 is sleeve-connected to an outer side of the first standing rod 40 and the other end of the locking part 42 is sleeve-connected to an outer side of the second standing rod 41. The locking part 42 is configured to lock the first standing rod 40 and the second standing rod 41.

Specifically, one end of the first standing rod 40 is fixedly connected to the front beam 1 by a screw (not shown in figures).

The locking part 42 includes a first sleeve connection portion 420 and a second sleeve connection portion 421. The first sleeve connection portion 420 is fixed and locked, by a first screw 422, on the outer side of the first standing rod 40, and the second sleeve connection portion 421 is fixed and locked, by a second screw 423, on the outer side of the second standing rod 41.

The supporting holder 7 and the second standing rod 41 are integrally formed, and the supporting holder 7 includes a first supporting rod 70 and a second supporting rod 71, with a position limitation groove 72 formed between the first supporting rod 70 and second supporting rod 71 for supporting the seat holder.

The second standing rod 41 is provided with a bending rod 43, and one end of the binding band 9 is sleeve-connected to the bending rod 43.

The caster wheel 6 is a universal wheel, and a rear side of the caster wheel 6 is provided with a braking vane 60. The caster wheel 6 is a standard part available in the market, and a specific structure of the caster wheel 6 may not be described in more details. After the bicycle is placed on the vertical parking holder, the caster wheel 6 may facilitate transferring of the vertical parking holder to an appropriate stopping place.

The present disclosure has at least one of the following beneficial effects.

Firstly, by forming a gap 30 between the pair of connecting rods 3 for receiving the rear wheel and by providing a pair of position limitation holders 5, with a distance therebetween being adjustable, on the pair of connecting rods 3, the vertical parking holder may be suitable for bicycles with wheels of different diameter sizes, improving applicability of the vertical parking holder.

Secondly, by providing a V-shape groove 50 on the position limitation holder 5 for position limitation of the rear wheel, the vertical parking holder may be suitable for bicycle tires of different tire widths.

Thirdly, by providing a telescopic rod 4, the vertical parking holder may be suitable for bicycles of different length sizes.

Fourthly, by providing a binding band 9 on the telescopic rod 4 for binding and fixing the seat holder, the vertical parking bicycle may provide better stability and higher safety for bicycles.

Lastly, by providing a universal wheel at the bottom of the vertical parking holder, it is convenient to transfer the vertical parking holder to an appropriated stopping place.

The above-described embodiments only provide some implementing manners of the present disclosure, with relatively specific and detailed description. However, it cannot thus be considered as limitation/definition on the patent scope of the present disclosure. It should be pointed out that some modification and improvement may be further made by those skilled in the art without departing from the conception of the present disclosure, which will be within the protection scope of the present disclosure. Therefore, the patent protection scope of the present disclosure should be defined by the attached claims.

What is claimed is:

1. A vertical parking holder, used for a bicycle comprising a rear wheel and a seat holder, comprising: a front beam, a rear beam, a pair of connecting rods parallel to each other, a telescopic rod and a pair of position limitation holders, wherein
one end of the telescopic rod is fixedly connected to the front beam and the other end of the telescopic rod is provided with a supporting holder for supporting the seat holder, and the telescopic rod is provided with a binding band for binding and fixing the seat holder;
one end of the connecting rod is fixedly connected to the front beam and the other end of the connecting rod is fixedly connected to the rear beam, with a gap formed between the pair of connecting rods for receiving the rear wheel; and
two ends of the position limitation holder are fixedly connected to the pair of connecting rods by adjusting screws respectively, and when the adjusting screw is unscrewed, each of the pair of position limitation holders is slidable on the connecting rod to adjust a distance between the pair of position limitation holders being adjustable for limiting the rear wheel of different sizes.

2. The vertical parking holder according to claim 1, wherein
the adjusting screw passes through the position limitation holder to prop against the connecting rod.

3. The vertical parking holder according to claim 1, wherein
the position limitation holder is provided with a first sliding hole and a second sliding hole, and the pair of connecting rods pass through the first sliding hole and the second sliding hole respectively.

4. The vertical parking holder according to claim 3, wherein
the position limitation holder is further provided with a rib between the first sliding hole and the second sliding hole.

5. The vertical parking holder according to claim 1, wherein
the position limitation holder is further provided with a groove portion on both sides of the position limitation holder to reduce a weight of the position limitation holder.

6. The vertical parking holder according to claim 1, wherein
an upper end of the position limitation holder is provided with a V-shape groove for position limitation of the rear wheel.

7. The vertical parking holder according to claim 1, wherein
the pair of connecting rods are fixedly connected to the front beam and the rear beam respectively by welding.

8. The vertical parking holder according to claim 1, wherein
the telescopic rod comprises a first standing rod, a second standing rod and a locking part, one end of the first standing rod is fixedly connected to the front beam and the other end of the first standing rod is sleeve-connected to one end of the second standing rod, the other end of the second standing rod is fixedly connected with the supporting holder, one end of the locking part is sleeve-connected to an outer side of the first standing rod and the other end of the locking part is sleeve-connected to an outer side of the second standing rod, and the locking part is configured to lock the first standing rod and the second standing rod.

9. The vertical parking holder according to claim 8, wherein
the supporting holder and the second standing rod are integrally formed, and the supporting holder comprises a first supporting rod and a second supporting rod, with a position limitation groove formed between the first supporting rod and second supporting rod for supporting the seat holder.

10. The vertical parking holder according to claim 8, wherein
the second standing rod is provided with a bending rod, and one end of the binding band is sleeve-connected to the bending rod.

11. The vertical parking holder according to claim 8, wherein
the locking part comprises a first sleeve connection portion and a second sleeve connection portion, the first sleeve connection portion is fixed and locked, by a first screw, on the outer side of the first standing rod, and the second sleeve connection portion is fixed and locked, by a second screw, on the outer side of the second standing rod.

12. The vertical parking holder according to claim 1, wherein each of the front beam and the rear beam is provided with a pair of caster wheels at the bottom.

13. The vertical parking holder according to claim 12, wherein
the caster wheel is a universal wheel.

14. The vertical parking holder according to claim 1, wherein
a rear side of a caster wheel is provided with a braking vane.

* * * * *